Dec. 3, 1963   G. W. RENNER   3,113,287
ELECTROACOUSTICAL TRANSDUCER MOUNTED ON BOAT HULL
Filed March 29, 1956   2 Sheets-Sheet 1

INVENTOR
GERARD W. RENNER
BY
AGENT

POLAR COORDINATE PLOT FOR TRANSDUCER HAVING DIAMETER TO THICKNESS RATIO OF 4.25

INVENTOR
GERARD W. RENNER
BY
AGENT

United States Patent Office 3,113,287
Patented Dec. 3, 1963

3,113,287
ELECTROACOUSTICAL TRANSDUCER MOUNTED ON BOAT HULL
Gerard W. Renner, Dorchester, Mass., assignor to Raytheon Company, Lexington, Mass., a corporation of Delaware
Filed Mar. 29, 1956, Ser. No. 574,653
5 Claims. (Cl. 340—8)

This invention relates generally to translating devices for converting compressional wave energy to electrical energy and vice versa. More particularly, the present invention relates to such devices as are used for underwater signaling, and is most particularly concerned with novel structural configurations and methods of constructing these devices.

Systems of underwater signal transmission and reception are known in which a beam of compressional wave energy is emitted by a transducer, and after being reflected by an intervening object the echo signal caused by the reflection is received by the same transducer. The time lapse between emission of the transmitted signal and reception of the echo signal may then be indicated by suitably calibrated receiving apparatus, and functions as a measure of the distance between the transducer and the object causing reflection.

In the past, it has been conventional practice to mount the transducer on the hull or keel of a vessel, and to bring the electrical cable connected to the transducer element into the vessel by means of a through-hull connector or "stuffing-tube." In general, the installation of the stuffing-tube was a simple operation, whereas mounting the vibratory transducer element into the stuffing-tube was an expensive and often improperly performed operation. The overall transducer package was, therefore, a relatively expensive item. In accordance with the present invention, a novel transducer package is provided wherein the vibratory element is incorporated directly into a specially designed housing having an integral stuffing-tube attached thereto. The entire package may then be quickly and efficiently attached to a suitable mounting area such as, for example, the bottom of a boat. Thus, a transducer element built into a housing which can be mounted through a hole in the hull and serve as its own stuffing-tube, considerably reduces the cost of the overall equipment. Additionally, the head of the housing which contains the transducer element is made elliptical in shape in order to streamline the overall structure, and prevent excessive turbulence as the vessel moves through the water. As another feature, the head is provided with projections which dig into the hull during installation and function to prevent rotation of the transducer package during the installation process. A further feature resides in the novel attachment of the conducting leads to the transducing element, connection to the element being made through the medium of plurality of thin metal strips, one end of each of which is attached to a surface of the transducer element, while the other end is attached to the lead-in cable. A still further feature relates to the physical dimensions of the vibratory element itself, wherein an optimum ratio between the diameter and thickness of the element is established in order to provide good definition of the radiation beam pattern, and reduce the effects of side lobing.

The invention will be better understood as the following description proceeds, taken in conjunction with the accompanying drawings wherein.

Figure 1:
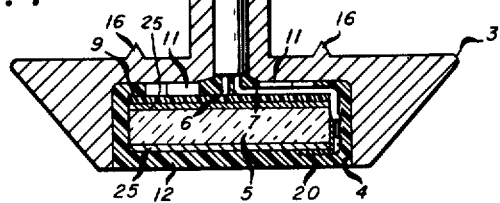
FIG. 1 is a partial cross-sectional side view of the housing and transducer vibratory element.
Figure 3:
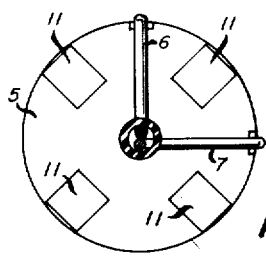
FIG. 3 is a plan view of the transducer vibratory element.

Referring now to the drawings, and more particularly to FIG. 1 thereof, there is shown generally at 10 an electroacoustical transducer structure in accordance with the present invention. As shown, the overall transducer structure comprises a relatively long, hollow, tubular portion 2, having an integral elongated head section 3. The tubular portion 2, and head portion 3 may be made of any suitable material, as for example, cast bronze. The under portion of head 3, remote from tube 2, is provided with a recessed area 4 adapted to receive and ensconce a transducing vibratory element 5. In order to electrically energize vibratory element 5, leads 6 and 7 of a cable 8 are, respectively, attached to the upper and lower surfaces of element 5. After lead attachment, an insulating plate 9 and spacers 11 may be placed on top of element 5, and element 5 may be drawn into recessed area 4 with cable 8 extending through the hollow tube 2. A suitable plastic material 12 fills the unoccupied portions of recess 4, and aids in holding element 5 in place. A nut 13 and a washer 14 screwed onto the threaded portion 15 of tube 2 provide means for securing the structure 10 to a suitable mounting surface.

Figure 2:
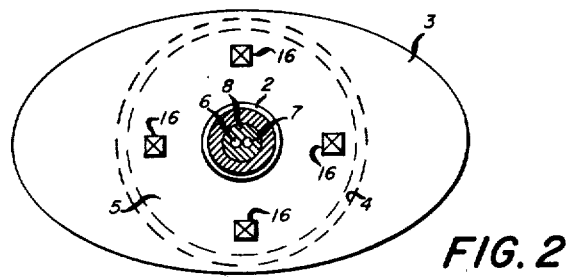
FIG. 2 is a partial section plan view of the structure of FIG. 1 taken on the line 2—2.
Figure 7:
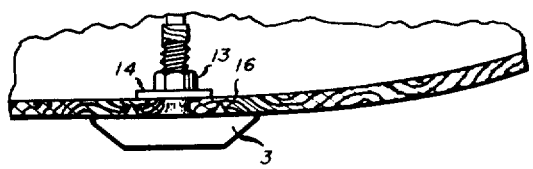
FIG. 7 is a fragmentary view of the bottom of a vessel showing the transducer package in place.

Since it is desirable to have vibratory element 5 as large as is consistent with other factors, head 3 is preferably of considerable size and, consequently, would ordinarily cause considerable water-turbulence as the vessel to which it was attached moved through the water. In order to prevent noise frequencies thereby created from interfering with proper operation of the transducer, head portion 3 has a streamlined elliptical cross-section as shown in FIG. 2. As a further feature, the upper surface of head portion 3 is provided with a plurality of tooth-like anti-rotate projections 16. Projections 16 are preferably four in number and are preferably located at points spaced approximately 90° from each other. Head 3 is preferably attached to the bottom of a vessel with the major axis of the ellipse along the direction of water flow (approximately fore and aft) in order to provide most effective streamlining, and hence, the least amount of water turbulence. Since the complete transducer package is fastened to the hull by a single nut 13, the transducer head 3 ordinarily tends to rotate during and after installation. Projections 16 eliminate this tendency by digging into the hull as soon as nut 13 is tightened and head 3 is brought up into contact with the hull, as shown in FIG. 7, thus preventing the entire transducer structure from rotating. Projections 16, therefore, act as an anti-rotation device to prevent misalignment of the transducer head during installation.

Figure 6:
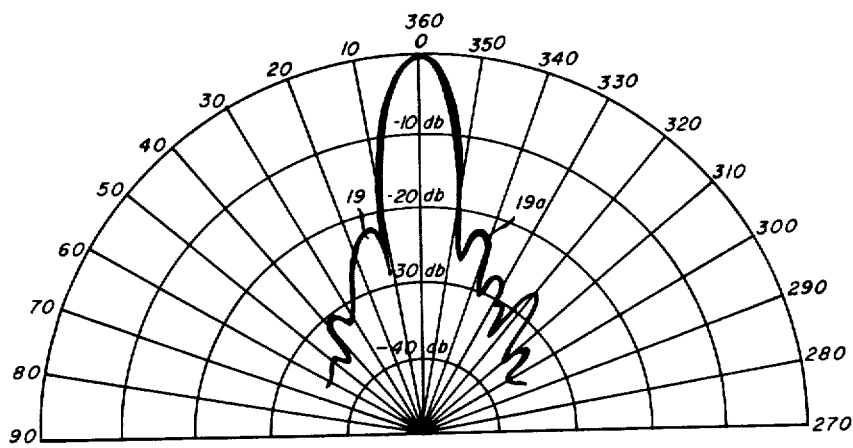
FIG. 6 is a radiation beam pattern useful in illustrating the effects of the optimum ratio between transducer element diameter and thickness.

Vibratory element 5 may be a circular disc or plate of a crystalline substance which undergoes physical deformation when supplied with electrical energy, thereby converting the electrical energy to vibrational sound energy and thus, sending ultrasonic waves into a material permeable to said sound energy with which it happens to be in contact consonant with principles well known in the art. For example, element 5 may be a disc of barium titanate. Upon energization by a transmitting source (not shown) element 5 will be set into vibration and will vibrate at a frequency dependent in part on its thickness, thus transmitting ultrasonic waves into the medium surrounding it. In accordance with the present inventive concept, it has been found that an optimum relationship may be caused to exist between the thickness and diameter of disc 5 so that the electroacoustical performance of the present device is considerably improved over heretofore known transducers when employed at a frequency of resonance determined by the thickness mode of vibration. The desirable operation thus achieved is believed to result from a choice of diameter-to-thickness ratio which will permit excitation of several modes of vibration at the frequency of nominal thickness resonance. In the case of a barium titanate disc, it has been determined that a ratio of 4.25 e.g.

$$\left(\frac{2.125'' \text{ diameter}}{.5'' \text{ thickness}}\right)$$

yields improved performance characteristics. When disc 5 is driven at a frequency on the order of 200 kc., the resonant frequency for this thickness, other modes of vibration are excited of such intensity as to modify the vibration of the disc. Instead of vibrating as a simple uniform piston, the motion across the surface of disc 5 varies due to the occurrence of these other modes. The 4.25 ratio for barium titanate thus permits excitation of several modes of vibration, all of high activity and all close to the 200 kc. nominal thickness resonance. The interaction of these modes upon each other results in a varying amplitude of motion across the face of disc 5 effectively producing a desirable shading action which reduces the first side lobes 19 and 19a to a point 23–25 db below the response on the main axis. This effect is illustrated on the polar coordinate plot of FIG. 6, and represents an improvement of about 6 db over known transducers wherein equal amplitude piston motion produces a side lobe response, which is ordinarily only down about 17 db from the response on the main axis.

It should be understood that the concept of the present invention is not limited to the 4.25 ratio wherein three modes of vibration are in evidence. Other ratios may exist which are of similar desirability. For example, it has also been found that two modes of vibration exist in disc 5 for ratios of 5.75 and 3.41. For materials other than barium titanate, such as quartz or Rochelle salt, having different sound velocities and Poisson's ratios, the exact value of the optimum diameter-to-thickness ratio will differ accordingly. However, the principal of side lobe reduction by proper choice of diameter and thickness will still apply.

Figure 4:
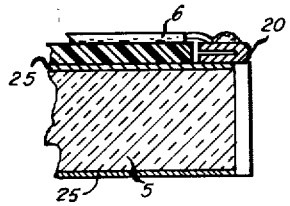
FIG. 4 is an enlarged fragmentary sectional view of the element of FIG. 3 showing one form of lead attachment.
Figure 5:
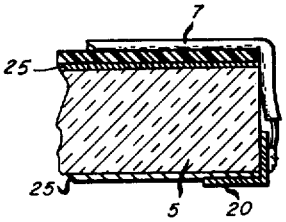
FIG. 5 is an enlarged fragmentary sectional view of the element of FIG. 3 showing another form of lead attachment.

We now turn to a description of the attachment of leads 6 and 7 to disc 5. In practice, the upper and lower surfaces of disc 5 are each provided with a thin layer 25 of electrically conductive material as, for example, a layer of silver which may be plated onto the surfaces. The normal procedure in the past has been to then solder the leads of a lead-in cable directly to the silvered electrodes. However, this technique has the disadvantage of requiring a very careful, expensive, soldering operation in order to avoid disturbing the adherence of the silver to the barium titanate disc 5 due to excessive heat. In addition, the silver plated electrodes often have such poor adherence to the disc 5 that a portion of the plating separates even when great care is used, and even in the instances when the above operation is successfully performed, the strength of the connection is comparatively small. In order to obviate these problems in the transducer structure of the present invention, the leads 6 and 7 are first soldered to one end of a strip 20 of thin metal foil which may be tinned copper, gold plated nickel, or any other suitable material. The other end of strips 20 may then be soldered to the silver electrodes 25, one to each side. In one form, strip 20 may be bent back on itself, as shown in FIG. 4, and lead 7 brought out through the hollow portion of tube 2. Since foils 20 are wide compared to the leads, the actual contact of foil 20 with disc 5 extends over a wider area than that encompassed if the leads are directly soldered to the surfaces, thus providing a strengthened connection. Foils 20 being very thin and good conductors of heat, require reduced time to bring the solder joint to the proper joining temperature, so that there is less danger of overheating and thereby depolarizing transducer element 5. To further reduce the strain on the soldered joint between foil 20 and disc 5, the end of strip 20, to which lead 7 is attached, may be cemented to the side of disc 5, as shown in FIGS. 1 and 5, thereby imposing most of the cable strain on the cemented area.

It can thus be seen that the transducer package of the present invention provides a unit which is more economical to manufacture, has improved performance characteristics, and is mechanically stronger than previous devices. Although there has been described what is considered to be a preferred embodiment of the present invention, various adaptations and modifications thereof may be made without departing from the spirit and scope of the invention as defined in the appended claims.

What is claimed is:

1. An electroacoustical transducer structure comprising a one-piece housing having an elongated head portion which is faired upwardly from the bottom toward the extremities thereof, a threaded stuffing-tube portion attached to the top surface of said head portion, securing means cooperatively associated with said stuffing tube for rigidly attaching said head portion to a mounting surface, a plurality of tooth-like projections disposed on the top surface of said head portion, a vibratory transducing element within a recess in said head portion and having thin metallic electrodes coated on the surface thereof, and conducting leads extending through said stuffing tube, each of said leads being a different one attached to a different one respective electrodes through the medium of a relatively thin metal foil one portion of each foil being attached to a respective electrode and another portion thereof being attached to a respective lead wire.

2. In combination, a boat hull, a transducer structure comprising a housing having a vibratory transducing element positioned therein, said housing having an opening in the lower portion thereof covered by material permeable to energy radiated from said vibratory element, a plurality of tooth-like projections disposed on the top surface of said housing, a tubular member attached to said housing and extending upwardly therefrom through a hole in said hull, conducting leads extending through said tubular member and attached to said vibratory element, and a nut engaging a threaded portion of said tubular member inside said boat hull and urging said housing against said boat hull in the area surrounding said hole.

3. In combination, a boat hull, a transducer structure comprising a faired housing having a vibratory transducing element positioned therein, said faired housing having an opening in the lower portion thereof covered by material permeable to energy radiated from said vibratory element, a plurality of tooth-like projections disposed on the top surface of said faired housing, a tubular member attached to said faired housing and extending upwardly therefrom through a hole in said hull, conducting leads extending through said tubular member and attached to said vibratory element, and a nut engaging a threaded portion of said tubular member inside said boat hull and urging said faired housing against said boat hull in the area surrounding said hole.

4. An electroacoustical transducer structure comprising a housing and a single substantially circular vibratory transducing element ensconced within said housing, said element having diameter-to-thickness ratio of 3.41.

5. An electroacoustical transducer structure comprising a housing and a single substantially circular vibratory transducing element ensconced within said housing, said element having diameter-to-thickness ratio of 5.75.

References Cited in the file of this patent

UNITED STATES PATENTS

| | | |
|---|---|---|
| 1,101,830 | Berger | June 30, 1914 |
| 1,974,920 | Hecht | Sept. 25, 1934 |
| 1,984,383 | Russell | Dec. 18, 1934 |
| 2,102,668 | Ballantine | Dec. 21, 1937 |
| 2,139,469 | Sachse | Dec. 6, 1938 |
| 2,447,333 | Hayes | Aug. 17, 1948 |
| 2,487,165 | Miller | Nov. 8, 1949 |
| 2,497,680 | Massa | Feb. 14, 1950 |
| 2,515,154 | Lamphier | July 11, 1950 |
| 2,529,658 | Massa | Nov. 14, 1950 |
| 2,569,987 | Frondel | Oct. 2, 1951 |
| 2,607,814 | Bloch | Aug. 19, 1952 |
| 2,618,698 | Janssen | Nov. 18, 1952 |
| 2,741,754 | Miller | Apr. 10, 1956 |
| 2,746,026 | Camp | May 15, 1956 |
| 2,759,783 | Ross | Aug. 21, 1956 |
| 2,768,364 | Camp | Oct. 23, 1956 |

OTHER REFERENCES

"Sonics," Hueter and Bolt, copyright 1955.

UNITED STATES PATENT OFFICE
CERTIFICATE OF CORRECTION

Patent No. 3,113,287            December 3, 1963

Gerard W. Renner

It is hereby certified that error appears in the above numbered patent requiring correction and that the said Letters Patent should read as corrected below.

Column 4, lines 38 and 39, strike out "a different one", each occurrence.

Signed and sealed this 5th day of May 1964.

(SEAL)
Attest:

ERNEST W. SWIDER            EDWARD J. BRENNER

Attesting Officer            Commissioner of Patents